United States Patent Office 2,741,636
Patented Apr. 10, 1956

2,741,636

PROCESS FOR MAKING 1,3-DIMETHYLCYCLO-PENTYLMETHYLAMINE

Howard R. Guest, Charleston, and Ben W. Kiff, Ona, W. Va., assignors to Union Carbide and Carbon Corporation, a corporation of New York No Drawing. Application June 29, 1954,
Serial No. 440,253

9 Claims. (Cl. 260—563)

This invention relates to a new chemical compound, 1,3-dimethylcyclopentylmethylamine and processes for making it. This compound is particularly useful as an inhibitor in liquids for the removal of acid soluble deposits on metal, such as scale in pipes. Combined with an acid such as hydrochloric acid it serves to inhibit the acid sufficiently to prevent undue destruction of the metallic surfaces being cleaned, while permitting the acid to attack the accumulated deposits. The compound can also be reacted with fatty acids to give paraffin and gasoline soluble soaps which are useful as lubricants. Other uses include that of an intermediate in the production of pharmaceuticals, insecticides and detergents.

Methacrolein dimer, 2,5-dimethyl-2,3-dihydro-2-formyl-1,4-pyran, is a known commercial product. This compound can be hydrogenated quantitatively to the saturated ring alcohol, 2,5-dimethyltetrahydropyran-2-methanol, as disclosed by R. R. Whetsone in U. S. Patent No. 2,610,193.

We have discovered that in the vapor phase and in the presence of the proper catalyst, 2,5-dimethyltetrahydropyran-2-methanol can be reacted with hydrogen and ammonia to produce 1,3-dimethylcyclopentylmethylamine, a hitherto unreported compound. The reaction may be represented as follows:

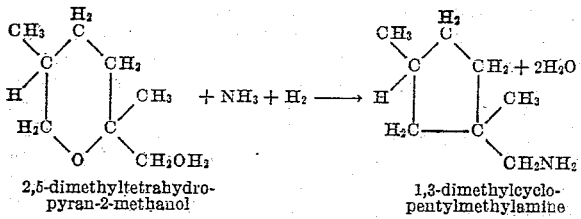

2,5-dimethyltetrahydro-pyran-2-methanol → 1,3-dimethylcyclopentylmethylamine

The reaction is unusual in that it involves both a dehydration, where the oxygen is removed from the ring, and a reductive amination, where the methylol group is converted to a methylamine group. To accomplish this dual reaction it is necessary to employ a catalyst which will simultaneously catalyze both of these reactions.

We have found that a catalyst comprising a major portion of activated alumina and minor portions of copper and chromium, with or without a small quantity of alkali metal sulfate catalyst promoter added, is effective in catalyzing the reaction. Our preferred catalyst is of this type and was made in accordance with the disclosures in pending application Serial No. 333,607 by Frank G. Young, and assigned to the same assignee as the present application. Such catalysts comprise from 0.5 per cent to 6.0 per cent by weight of copper and from 0.1 per cent to about 2 per cent or more by weight of chromium, with the balance an activated substantially alkali-free alumina. Additionally there may be present from 0.05 per cent to 0.10 per cent by weight of an alkali metal sulfate such as sodium sulfate present to act as a catalyst promoter. It is important that the active alumina used in making the catalyst be substantially free from alkalies.

The catalyst can be prepared in conventional manner by impregnating the alumina with an aqueous solution of thermally unstable salts of copper and of chromium such as cupric nitrate trihydrate and chromic nitrate nonahydrate, with or without an aqueous solution of an alkali metal sulfate such as sodium sulfate or potassium sulfate, evaporating the water and decomposing the unstable salts to the metal oxides by heating in air above the decomposition temperatures of the salts. The copper oxide is then reduced to metallic copper in a stream of hydrogen at an elevated temperature before the catalyst is used.

As will be seen from the examples, the temperatures employed are very important to the yield and efficiency of the invention. The reaction may be run at temperatures of 225° to 350° C., but for good yields and efficiency a temperature range of 275° to 325° C. is preferred, with the optimum temperature being about 300° C. Using the preferred temperature range, yields and efficiencies of better than 80 per cent can be achieved.

The reaction must be conducted in the vapor phase and preferably a continuous process is used wherein the reactants, including an excess of hydrogen and ammonia, are passed together over the copper-chromium-alumina catalyst in a suitably heated reaction zone. Whether the process is batch or continuous, it is important that a molar excess of hydrogen and ammonia be present at all times to assure maximum yield and efficiency.

The initial product of either the batch or continuous process is refined and stripped of water and side products by conventional distillation techniques to yield the refined 1,3-dimethylcyclopentylmethylamine product.

Example I

The reaction vessel consisted of a vertical 42 inch long stainless steel tube of one inch inside diameter with walls ⅛ inch thick. The tube was enclosed in a jacket containing heated commercial heat-transfer fluid. The top of the tube was sealed and equipped with connections for introducing the reactants. At the bottom of the tube was a wire mesh catalyst support and below this a connection into a water-cooled condenser which in turn was connected to a receiver for the product. The tube was filled for approximately three-quarters of its height with 400 cc. of a copper-chromium-alumina catalyst consisting of alumina particles, 4 to 8 mesh in size, impregnated with 4.75 per cent by weight of copper, 0.19 per cent by weight of chromium oxide and 0.09 per cent by weight of sodium sulfate. The space in the reaction tube above the catalyst was filled with inert ceramically bonded porous alumina and served as a preheating area to bring the reactants up to the reaction temperature before they passed over the catalyst. The reaction tube was maintained at a temperature of 305° C. throughout the reaction.

During a reaction period of seven and one-half hours 408 grams of 2,5-dimethyltetrahydropyran-2-methanol was fed into the reaction tube at a rate of about 54.4 grams per hour. Concurrently 50 liters per hour of ammonia and 50 liters per hour of hydrogen were passed through the tube. The contact time for the vapors in the catalyst filled portion of the reaction tube was about 3.5 seconds. The effluent vapors from the bottom of the reaction tube were cooled by passage through the condenser and a water layer weighing 66 grams and an oil layer weighing 380 grams were collected in the receiver. The oil layer was drawn off and distilled in a still where an additional 40 grams of water was removed. The main cut recovered from the still was collected at a temperature of 50° to 53° C. at a pressure of 10 mm. of mercury and was identified as 1,3-dimethylcyclopentylmethylamine. An additional 31 grams of high-boiling unidentified material was also obtained from the still but no unreacted 2,5-dimethyltetrahydropyran-2-methanol was recovered.

Based on the alcohol fed to the reaction tube, the yield of 1,3-dimethylcyclopentylmethylamine was 81.6 per cent.

Elemental analysis of this product gave the following composition: 75.8 per cent carbon; 12.9 per cent hydrogen; and 11.3 per cent nitrogen. The theoretical values are 75.6 per cent carbon; 13.4 per cent hydrogen; and 11.0 per cent nitrogen. Acid titration of the amine group of the product gave an equivalent weight of 129 compared to the theoretical equivalent weight of 127.

*Example II*

The reaction tube, catalyst and product recovery techniques were the same as in Example I. In this example however 404 grams of 2,5-dimethyltetrahydropyran-2-methanol was fed into the reaction tube over a period of seven hours, at a rate of about 57.7 grams per hour. Concurrently, 50 liters per hour each of hydrogen and ammonia were passed through the tube. The temperature of the reaction tube was maintained at 283° C. throughout the run. Two hundred and seven grams of the desired 1,3-dimethylcyclopentylmethylamine was obtained by distillation of the condensed reaction product. Based upon the quantity of 2,5-dimethyltetrahydropyran-2-methanol fed to the reaction tube, the 207 grams of product represented a yield of 77.8 per cent. No unreacted 2,5-dimethyltetrahydropyran-2-methanol was recovered.

*Example III*

The run of this example was identical in every respect with Example II, except that the temperature of the reaction tube was maintained at only 247° C. throughout the run. Based on the quantity of 2,5-dimethyltetrahydropyran-2-methanol fed to the reaction tube, the yield of 1,3-dimethylcyclopentylmethylamine was only 35 per cent. The efficiency however was 60.7 per cent because an appreciable quantity of unreacted 2,5-dimethyltetrahydropyran-2-methanol was recovered from the reaction product.

We claim:

1. A process for the production of 1,3-dimethylcyclopentylmethylamine which comprises reacting together at a temperature of 225° to 350° C. in the vapor phase 2,5-dimethyltetrahydropyran-2-methanol, hydrogen and ammonia, in the presence of an excess of hydrogen and an excess of ammonia and in the presence of a catalyst comprising from 0.5 per cent to 6.0 per cent by weight of copper, from 0.1 per cent to 2 per cent by weight of chromium and the balance an activated, substantially alkali-free alumina.

2. A process for the production of 1,3-dimethylcyclopentylmethylamine which comprises reacting together at a temperature of 275° to 325° C. in the vapor phase 2,5-dimethyltetrahydropyran-2-methanol, hydrogen, and ammonia, in the presence of an excess of hydrogen and an excess of ammonia and in the presence of a catalyst comprising from 0.5 per cent to 6.0 per cent by weight of copper, from 0.1 per cent to 2 per cent by weight of chromium and the balance an activated, substantially alkali-free alumina.

3. A process for the production of 1,3-dimethylcyclopentylmethylamine which comprises reacting together at a temperature of about 300° C. in the vapor phase 2,5-dimethyltetrahydropyran-2-methanol, hydrogen and ammonia, in the presence of an excess of hydrogen and an excess of ammonia and in the presence of a catalyst comprising from 0.5 per cent to 6.0 per cent by weight of copper, from 0.1 per cent to 2 per cent by weight of chromium and the balance an activated, substantially alkali-free alumina.

4. A process for the continuous production of 1,3-dimethylcyclopentylmethylamine which comprises simultaneously passing gaseous 2,5-dimethyltetrahydropyran-2-methanol, an excess of gaseous hydrogen and an excess of gaseous ammonia, at a temperature of 225° to 350° C., over a catalyst comprising from 0.5 per cent to 6.0 per cent by weight of copper, from 0.1 per cent to 2 per cent by weight of chromium and the balance an activated, substantially alkali-free alumina, continuously collecting and condensing the resulting effluent vapors and separating therefrom as product 1,3-dimethylcyclopentylmethylamine.

5. A process for the continuous production of 1,3-dimethylcyclopentylmethylamine which comprises simultaneously passing gaseous 2,5-dimethyltetrahydropyran-2-methanol, an excess of gaseous hydrogen and an excess of gaseous ammonia, at a temperature of 275° to 325° C. over a catalyst comprising from 0.5 per cent to 6.0 per cent by weight of copper, from 0.1 per cent to 2 per cent by weight of chromium and the balance an activated, substantially alkali-free alumina, continuously collecting and condensing the resulting effluent vapors and separating therefrom as product 1,3-dimethylcyclopentylmethylamine.

6. A process for the continuous production of 1,3-dimethylcyclopentylmethylamine which comprises simultaneously passing gaseous 2,5-dimethyltetrahydropyran-2-methanol, an excess of gaseous hydrogen and an excess of gaseous ammonia, at a temperature of about 300° C., over a catalyst comprising from 0.5 per cent to 6.0 per cent by weight of copper, from 0.1 per cent to 2 per cent by weight of chromium and the balance an activated, substantially alkali-free alumina, continuously collecting and condensing the resulting effluent vapors and separating therefrom as product 1,3-dimethylcyclopentylmethylamine.

7. A process for the continuous production of 1,3-dimethylcyclopentylmethylamine which comprises simultaneously passing 2,5-dimethyltetrahydropyran-2-methanol in vapor form, an excess of gaseous hydrogen and an excess of gaseous ammonia, at a temperature of 225° to 350° C. over a catalyst comprising from 0.5 per cent to 6.0 percent by weight of copper, from 0.1 per cent to 2 per cent by weight of chromium, from 0.05 per cent to 0.10 per cent by weight of an alkali metal sulfate and the balance an activated, substantially alkali-free alumina, continuously collecting and condensing the resulting effluent vapors and separating therefrom as product 1,3-dimethylcyclopentylmethylamine.

8. A process for the continuous production of 1,3-dimethylcyclopentylmethylamine which comprises simultaneously passing 2,5-dimethyltetrahydropyran-2-methanol in vapor form, an excess of gaseous hydrogen and an excess of gaseous ammonia, at a temperature of 275° to 325° C. over a catalyst comprising from 0.5 per cent to 6.0 per cent by weight of copper, from 0.1 per cent to 2 per cent by weight of chromium, from 0.05 per cent to 0.10 per cent by weight of an alkali metal sulfate and the balance an activated, substantially alkali-free alumina, continuously collecting and condensing the resulting effluent vapors and separating therefrom as product 1,3-dimethylcyclopentylmethylamine.

9. A process for the continuous production of 1,3-dimethylcyclopentylmethylamine which comprises simultaneously passing 2,5-dimethyltetrahydropyran-2-methanol in vapor form, an excess of gaseous hydrogen and an excess of gaseous ammonia, at a temperature of about 300° C. over a catalyst comprising from 0.5 per cent to 6.0 per cent by weight of copper, from 0.1 per cent to 2 per cent by weight of chromium, from 0.05 per cent to 0.10 per cent by weight of an alkali metal sulfate and the balance an activated, substantially alkali-free alumina, continuously collecting and condensing the resulting effluent vapors and separating therefrom as product 1,3-dimethylcyclopentylmethylamine.

References Cited in the file of this patent

Braum et al.: "Ber." (1933), vol. 66 B, pp. 1373–8.
Wallach: "Chem. Abst." (1911), vol. 5, pp. 2080–1.